United States Patent [19]

Acosta

[11] Patent Number: 4,764,271
[45] Date of Patent: Aug. 16, 1988

[54] WATER TREATMENT APPARATUS

[76] Inventor: William A. Acosta, 4101 Laurel Dr., Lafayette Hill, Pa. 19444

[21] Appl. No.: 14,895

[22] Filed: Feb. 13, 1987

[51] Int. Cl.[4] .............................................. C02F 9/00
[52] U.S. Cl. ..................................... 210/86; 210/96.1; 210/143; 210/182; 210/256; 210/266; 210/282
[58] Field of Search ................. 210/85, 86, 96.1, 97, 210/99, 104, 105, 109, 143, 149, 175, 181–186, 232, 256, 259–261, 266, 284, 282, 416.1, 416.3, 420–424, 900

[56] References Cited

U.S. PATENT DOCUMENTS

| | | | |
|---|---|---|---|
| 3,262,570 | 7/1963 | Gailitis et al. | 210/266 |
| 3,327,859 | 12/1963 | Pall | 210/266 |
| 3,870,033 | 3/1975 | Faylor et al. | 210/900 |
| 3,928,163 | 12/1975 | Ullmann et al. | 204/206 |
| 4,383,920 | 5/1983 | Muller et al. | 210/284 |
| 4,460,465 | 7/1984 | Zacharkow et al. | 210/266 |
| 4,622,133 | 11/1986 | Furuno | 210/96.1 |
| 4,664,793 | 5/1987 | Murakami et al. | 210/182 |
| 4,682,113 | 7/1987 | Barben | 210/900 |

Primary Examiner—Ivars Cintins
Attorney, Agent, or Firm—Caesar, Rivise, Bernstein, Cohen & Pokotilow, Ltd.

[57] ABSTRACT

A self-contained, modular system for conditioning water by solids removal, dissolved contaminant removal, and temperature control, so that said water is suitable for use in a system, such as a WEDM system. The modular system includes a first tank for receiving water to be conditioned, a filtration and ion adjusting section, a temperature adjusting section, a second tank for receiving conditioned water and sensor and control elements. The filtration and ion adjusting section has a first pump coupled to the first tank for pumping water from the first tank to the first filtration element. The filtration and ion adjusting section includes a selectable element for enabling at least a portion of the filtered water to be pumped directly to the second tank or else to means for deionizing the water. The temperature adjusting section has an element for adjusting the temperature of the water in the second tank, either heating it or cooling it. Sensors associated with the second tank provide electrical signals indicative of the electrical conductivity or (resistivity) of the water in the tank as well as its temperature. Water from the second tank can be sent back to the first filtration and ion adjusting section for subsequent conditioning in the event that the electrical conductivity or resistivity of the water in the second tank is not at the desired value. The first filtration and ion adjusting element is preferably in the form of a common housing having a filter cartridge disposed within the housing and defining an interior space in which deionizing element is located.

52 Claims, 5 Drawing Sheets

WATER TREATMENT APPARATUS

BACKGROUND OF THE INVENTION

This invention relates generally to systems for conditioning water and more particularly the systems for multiple conditioning of water by solids removal, dissolved contaminant removal, and temperature control.

In various industries there is a significant need for conditioned water meeting certain criteria for use within a product to be manufactured or for process needs, such as cooling, flushing, etc. For example, with respect to the Wire Electric Discharge Machine (WEDM) industry water of certain parameters, such as conductivity, maximum suspended particle size, etc., is needed to effect the operation of the machine. As is known a WEDM machine utilizes an electric current passed through a moving wire to a terminal in the path of a block of metal to be shaped or machined. The "shorting out" of the current results in the production of sparks which erodes a minute part of the metal, whereupon the metal is actually cut by the moving wire. With WEDM machines one is able to form intricate two and three dimensional shapes which could not heretofore be cut with difficult materials, such as hardened steel, etc. Inasmuch as the cutting action produces heat it is necessary to cool the work for dimensional control, to flush away contaminants, such as metal particles, suspended and dissolved contaminants, etc., and to permit a clear cutting path, while also insulating the workpiece so that the electrical sparks can be concentrated at the cutting edge and not stray into adjacent material. Thus, deionized water has been utilized for those purposes. In order to maintain the quality of the deionized water, equipment has been used to filter it, adjust its conductivity and control its temperature. Heretofore such conditioning has been accomplished piecemeal with little emphasis on measuring and controlling water conditions to meet changing demands of the WEDM machines.

In U.S. Pat. No. 3,928,163 (Ullmann, et al.) there is disclosed a WEDM machine having an associated system for conditioning water used therewith. To that end the Ullmann, et al. patent measures the quantity of used and stored water pumped from a storage tank back to the WEDM work. A conductivity controller located downstream of the storage tank controls the opening or closing of a solenoid valve directing used water, supplied by a separate pump, to a deionization or resin cartridge and back into the storage tank.

While the deionization system of the Ullmann, et al. patent does offer some advantages over the prior art by providing automatic deionization control taking into account changing conductivity levels of the water, it nevertheless suffers from various disadvantages. Thus, with the Ullmann system by the time that the conductivity sensor discovers that the water is less than the quality desired and directs the water to the resin bed for further treatment (i.e., deionization) it is already too late inasmuch as the water measured is already on its way to the WEDM machine. At best with the Ullmann system the water deionized by the measuring and controlling means may improve the quality of water still left in the storage tank after the measured water in the conduits has already flowed to the WEDM machine. Moreover, by monitoring the conductivity downstream of the water in the tank the water left in the tank without continuous treatment will normally degrade by air contamination so that it is not necessarily in the desired condition when it is ultimately pumped to the work. Moreover, unless contaminated water is properly prefiltered to remove a high percentage of solid contamination the life and effectiveness of the deionizing resin bed is substantially impaired, if not rendered useless.

Heretofore temperature control of the deionized water has been effected by the use of a heat exchanger installed directly in line to the WEDM machine. This arrangement requires large heat exchange equipment to provide temperature control over wide temperature ranges, thus possibly causing thermal distortion of the workpiece, the wire and the fixturing.

The prior art includes various patents utilizing a combined filter and deionization device within a single housing, such as U.S. Pat. Nos. 3,262,570 (Gailitis, et al.), 4,460,465 (Zacharkow, et al.) and 3,327,859 (Paul). However, such devices leave much to be desired from the standpoint of simplicity construction and the ability to select filtration without deionization or filtration with deionization. Accordingly, such prior art devices are not particularly suitable for use in a system for automatically conditioning water, such as in a WEDM system.

In view of the foregoing, a need presently exists for an integrated system, preferably modular, for effecting the automated multiple conditioning of water, that is, the removal of solid contaminants, dissolved contaminants and temperature control.

OBJECTS OF THE INVENTION

Accordingly, it is a general object of the instant invention to provide a system which overcomes the disadvantages of the prior art.

It is still a further object of the instant invention to provide a self-contained, modular system for conditioning water for use in a predetermined process.

It is still a further object of this invention to provide a self-contained, modular system for conditioning water for use in a predetermined process by filtration, ion content adjustment and temperature control.

It is still a further object of this invention to provide a self-contained, modular system including control means and sensor means, for effecting the filtration, ion adjustment and temperature adjustment of water for use in a process and wherein said conditioning can be effected either automatically or manually and independently of the process.

It is yet a further object of this invention to provide a combined filter/deionizer unit having particular utility in the aforementioned system but which can also be used in any system requiring filtration and selective deionization.

SUMMARY OF THE INVENTION

These and other objects of the instant invention are achieved by providing a self-contained, modular system for conditioning water for use in a predetermined process, and a combined filter/deionizer unit suitable for use in that system or in any system requiring filtration and selective deionization. Thus, according to one aspect of the invention the self-contained modular system comprises a first tank adapted to receive water to be conditioned, a filtration and ion adjusting section, a temperature adjusting section, second tank means for receiving conditioned water, and sensor and control means. The filtration and ion adjusting section comprises a first pump coupled to the first tank for providing water from the first tank to first filtration means. The first filtration means is operative to remove solids greater than a first predetermined size from the water in the first tank. Selectable means are also provided in the filtration and ion adjusting section for enabling at least a portion of the water from the first filtration means to be pumped by the first pump directly to the second tank or to means for adjusting the ion content of the water provided thereto. The water from the ion adjusting means is also provided by the first pump to the second tank. The temperature adjusting section comprises temperature adjusting means for adjusting the temperature of the water in the second tank. The sensor and control means comprises sensor means associated with the second tank for providing electrical signals indicative of the electrical conductivity or resistivity and temperature of the water in the second tank and means for enabling water from the second tank to be provided back to the first filtration and ion adjusting section for subsequent conditioning in the event that the electrical conductivity or resistivity of the water in the second tank is not as desired.

In accordance with another aspect of the invention the first filtration means and the ion adjusting means is in the form of a common device. That device has particular utility in the self-contained modular system of this invention as well as in other water conditioning applications. Thus the device basically comprises a common housing, filter medium means disposed within the housing and defining an interior space, deionizing means disposed within the interior space, and selectable means arranged to enable at least a portion of the water flowing through the filter medium to be directed through the deionizing means or directly to an outlet of the device, depending upon the setting of the selectable means. The outlet is coupled to the deionizing means downstream thereof so that any water flowing through the deionizing means also flows to the outlet. The selectable means is arranged to prevent any water from the filter medium to flow through the deionizing means, whereupon all of the water flowing through the filter medium flows directly to the device's outlet.

DETAILED DESCRIPTION OF THE PREFERRED EMBODIMENT

Figure 1:
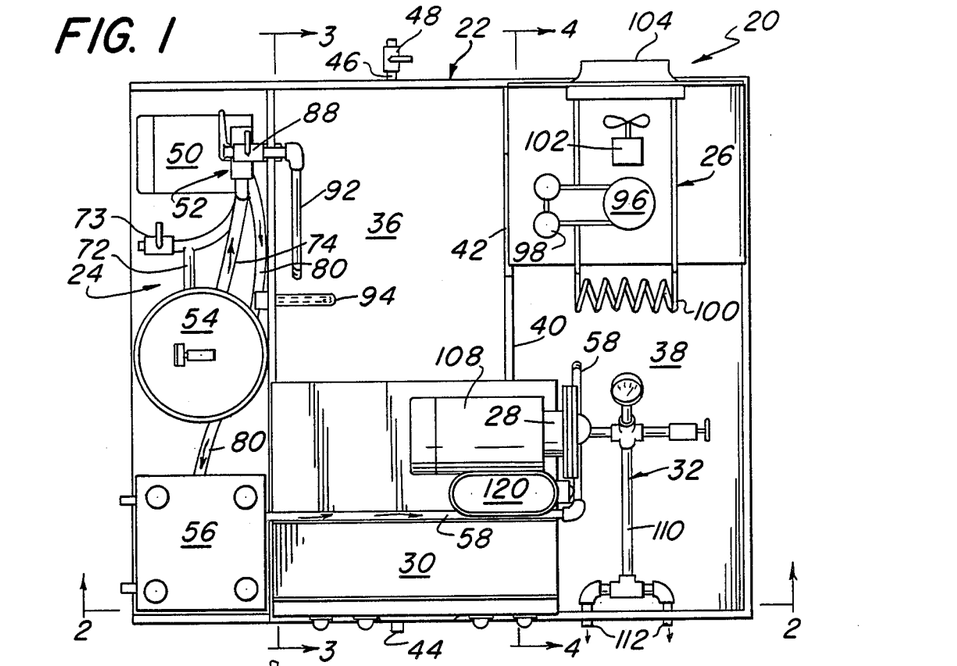
FIG. 1 is a top plan view of a self-contained modular system for conditioning water constructed in accordance with the subject invention.

Referring now to the various figures of the drawing wherein like reference characters refer to like parts, there is shown at 20 in FIG. 1 a self-contained, modular system for conditioning water, or other liquids, for use in a predetermined process. The following description will consider the subject invention for conditioning water use with a WEDM machine. It must be pointed out, however, that the subject system can be utilized for any type of process or with any type of apparatus or system needing water or other liquid(s) that has been conditioned by solids removal, dissolved contaminants removal, and temperature control. That conditioning can occur either continually or intermittently and independently of the operation of the WEDM machine or other process.

Figure 2:
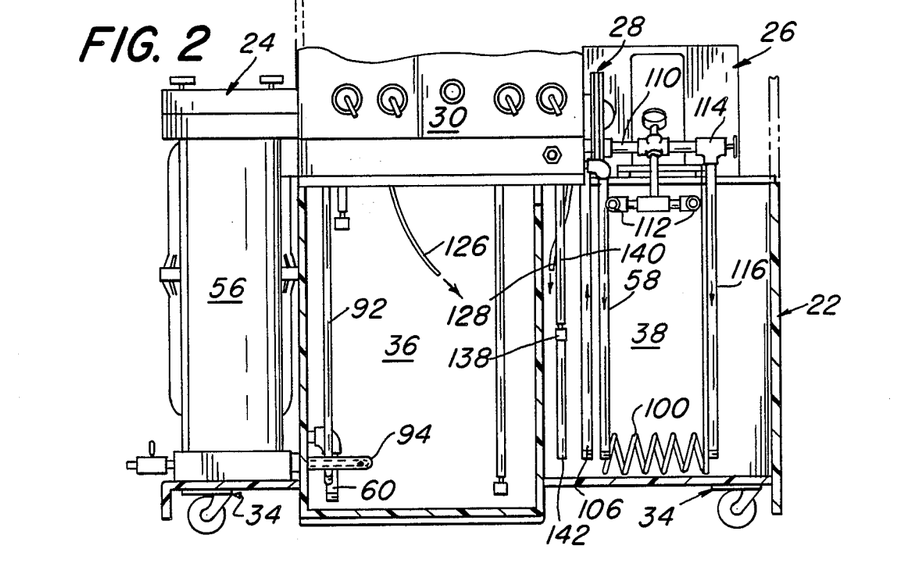
FIG. 2 is a vertical sectional view taken along line 2—2 of FIG. 1.
Figure 3:
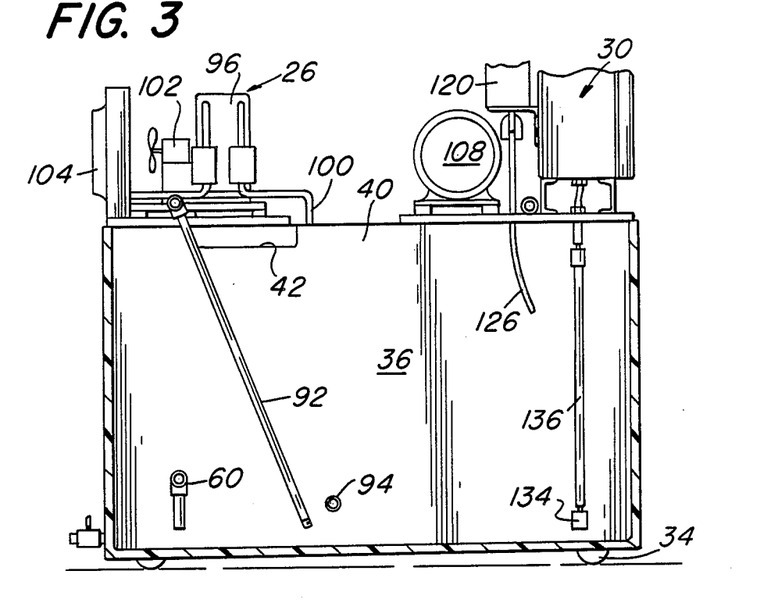
FIG. 3 is a vertical sectional view taken along line 3—3 of FIG. 1.
Figure 4:
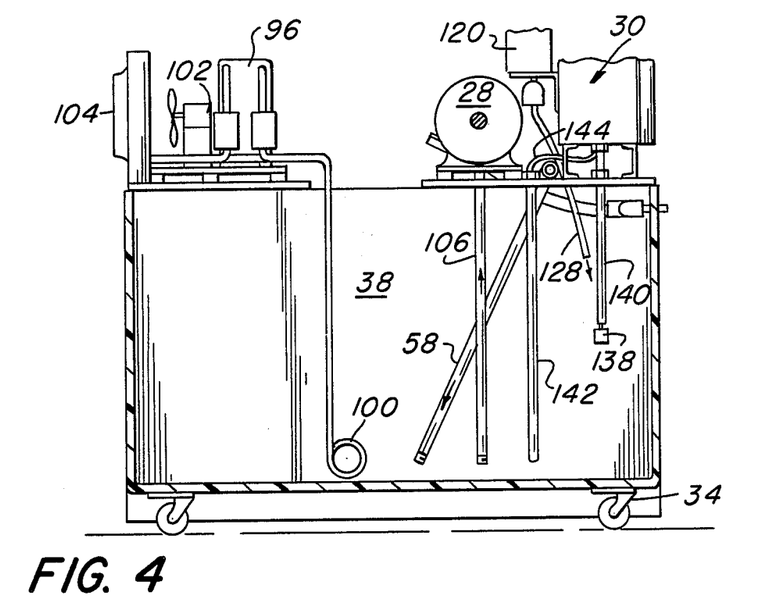
FIG. 4 is a vertical sectional view taken along line 4—4 of FIG. 1.

As can be seen in FIG. 1 the system 20 basically comprises a tank module 22, a pump/filtration module 24, a temperature control module 26, a conditioned water supply pump module 28, a monitoring and control module 30, and associated conduits 32, all mounted on a common, swivel-wheeled base 34 (FIG. 2). Thus, the system 20 can be readily moved to any location for providing conditioned water to the desired equipment, e.g., WEDM machine.

The tank module 22 basically comprises a multiple compartment tank having a "dirty/receiving" compartment or tank 36 and a "clean/storage" compartment or tank 38. The multicompartment tank is constructed of water corrosion resistant material, such as fiberglass. The two tanks are disposed adjacent each other with the wall 40 separating them including a lower edge or weir 42 over which water from the clean tank 38 can flow back into the dirty tank for reprocessing. In this connection, as will be described later, the system 20 is arranged continually or intermittently condition the water independent of the WEDM or other manufacturing process operations.

The dirty/receiving tank 36 includes an inlet 44 through which dirty water from the WEDM machine is brought by either gravity or an external pump (not shown).

The bottom of each tank 36 and 38 is slightly sloped (not shown) to enable each to be drained completely for cleaning. Thus, the dirty/receiving tank 36 includes a drain line 46 disposed on the back wall of the tank at the bottom thereof. A manual valve 48 is mounted in the drain line to enable the flow of water out of the tank through that line.

The pump/filtration module 24 basically comprises primary pumping means 50, selection means in the form of operational mode selecting valve 52, a primary filtration unit 54, and a combined filtration/ion adjustment unit 56.

The primary pumping means is arranged to effect the pumping of the water from the dirty/receiving tank 36 through the various water conditioning components of the system 20. Inasmuch as the water in the dirty/receiving tank may contain substantial particulate materials, e.g., metal chips, which are quite abrasive, the primary pumping means preferably consists of a centrifugal pump and not a positive displacement pump (the latter of which would quickly be rendered inoperative by abrasive particles). Inasmuch as centrifugal pumps are sensitive to varying pressure loads and since there are several components, e.g., the valve 52, the primary filter 54, the combined filter/ion adjusting unit 56 in the path from the pump to the clean tank, pressure regulation means may be included in that path to enable the pump to operate efficiently.

The primary filtration unit 54 serves as the primary means for effecting removal of solids from the water in the dirty/receiving tank and basically consists of any conventional type of filter. In the preferred embodiment the filtration unit 54 consists of a precoatable, diatomaceous earth filter. Such a filter, or any other conventional type of filter unit, is desirable in the interests of low operating costs, since such filters are less expensive to use than replaceable cartridge filters (which is used in the combined filtration/ion adjusting unit to be described later).

The combined filtration/ion adjusting unit 56 constitutes an independent aspect of this invention. In this regard the unit 56 can be used in any filtration/ion adjusting, e.g., deionizing, application even though it has particular utility in the system 20 herein. The unit 56 will be described in considerable detail later. Suffice for now to state that it includes two sections, namely, a filter section for removing particulate material from the water, as well as an ion adjusting, e.g., deionizing, section. The deionization section can be selectively engaged so that the water passing through the filter section can either bypass the deionizing section or can flow through it to adjust the ion content in the water. Thus, the unit 56 can provide either filtered water or filtered and deionized water. The filter section of unit 56 includes a suitably constructed filter medium having a high flow/solids capacity. The filter in the unit 56 is normally used in conjunction with the primary filter and thus serves as a "secondary" filter in such use. However, in some cases, to be described later, when the primary filter unit 54 is off line or otherwise unavailable, the filter in unit 56 serves as the only filter for the water from the dirty tank. Thus, when used in conjunction with the primary filter 54, the filtering section of combined unit 52 provides dual filtration of the water for greater effectiveness, e.g., it traps any precoat (e.g., diatomaceous earth) particles exiting the primary filter from flowing into the ion adjusting section of the unit 56 and from there into the clean tank 36.

When used alone the filtration section of combined unit 56 serves as the "primary" means for filtering dirty water from tank 36. Such operation is carried out in the event that the primary filter unit 54 becomes inoperative or is otherwise out of service, e.g., is being cleaned. Thus, even if the primary filter 54 is not operative, the system 20 can provide continuous filtration for the water from the dirty tank so that it can be provided to the clean tank and subsequently to the WEDM machine without any stoppage in service.

The outlet of the combined filtration/ion adjusting unit 52 is provided via a conduit 58 to the interior of the clean tank 38.

The operational mode selecting valve 52 will be described in detail later. Suffice to state that it basically comprises a six way, manually adjustable diverter valve for establishing six different modes of operation of the system 20. Thus, the valve can be placed in any one of six settings, namely, a "filter" setting, a "by-pass" setting, a "redistribute" setting, a "recycle/blowdown" setting, a "drain" setting, and an "off" setting.

Figure 6:
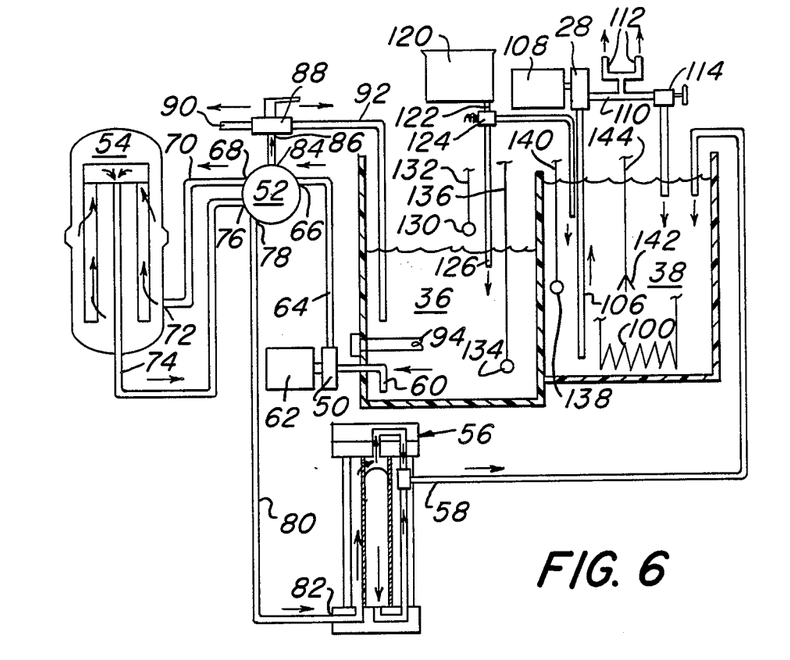
FIG. 6 is a diagram showing the interconnection of the various components of the system shown in FIG. 1.

The general construction and operation of the system 20 in each of those settings will now be described and can best be appreciated by reference to FIG. 6. As can be seen therein a pipe 60 is located within the bottom of the dirty tank and serves as the inlet to the centrifugal (primary) pump 50. Power to drive the pump is provided by an electric motor 62 under control of the control module 30. The outlet of pump 50 is provided, via a conduit 64, to one port 66 of the six way valve 52. The valve 52 also includes another port 68 which is coupled, via a conduit 70, to the inlet 72 of the primary filter 54. The outlet of the filter 54 is provided, via conduit 74, to another port 76 of the valve 52. The valve 52 also includes another port 78 coupled, via a conduit 80, to the inlet 82 of the secondary filter/ion adjusting unit 56. As noted earlier the outlet of unit 56 is provided via conduit 58 back to the interior of the clean/receiving tank 38. Still another port 84 of the valve 52 is coupled, via a conduit, to the inlet 86 of a manually adjustable three way valve 88. The valve 88 includes a pair of outlet ports, one of which is coupled, via a conduit 90, to a drain and the other is coupled, via a conduit 92, back to the interior of the dirty/receiving tank 36.

Operation of the unit 20 in the filter mode, that is, when the valve is in the "filter" setting, is as follows: dirty water from the dirty water tank 36 is pumped by the filter pump 50 through conduits 60 and 64 into port 66 of the six way valve. The water flows through the valve and exits through port 68 and from there through line 70 into the primary filter 54 inlet 72. The water flows through the primary filter, where the diatomaceous earth cake traps suspended solids of size in excess of the medium's capacity. In a system for use with a WEDM machine the maximum particle size is preferably no greater than 3-5 microns. The filtered water passes through conduit 74 back into port 76 of the six way valve, through the valve to port 78. The water thus flows through communicating conduit 80 into inlet 82 of the combined filter/ion adjusting unit 56. The filter section (to be described later) of the unit 56 serves to further filter the water and to remove any diatomaceous earth particles which may have escaped from the primary filter 54.

As noted earlier, the unit 56 includes selector means, also to be described later, which either enables the filtered water to flow directly to the unit's outlet or else to be further conditioned, that is, deionized, by flowing through the ion adjusting section (to be described later) of the unit and then to the unit's outlet. In either event the water from the outlet of the unit 56 (which is either filtered or filtered and deionized) flows through conduit 58 into the clean tank 38.

It is in the clean tank that the temperature of the water is adjusted to the desired level in response to the measurement of the temperature of the water therein. Thus, the system 20 includes temperature sensor means (to be described later) coupled to the control module for providing an electrical signal indicative of the temperature of the water in that tank. That signal is used to control the operation of the temperature adjusting means to either cool or heat the water, as required. In addition, sensor means are provided within the tank 38 to measure the conductivity (or resistivity) of the water to ensure that it is at the desired level before it is pumped by the conditioned water supply pump module 28 to the WEDM machine. In the event that the water conductivity is not as desired, the system 20 is arranged to recycle the water from the clean tank back to the dirty tank for further processing until the clean tank water meets the desired parameters. Thus, the primary pumping means 50 continues to operate to draw water from the dirty tank to pass it through the components as just described. When the water within the clean/storage tank reaches the height of the weir 42 it spills over into the dirty tank. Hence, the water can be continuously recycled until it is at the desired conductivity and/or temperature.

It should also be noted that the system as just described can also operate to recycle water to bring it to the desired freedom from particulate material in excess of a predetermined size, conductivity and temperature conditions independently of the operation of the WEDM machine or in conjunction with the operation of that system (i.e., when on line with the WEDM machine).

Figure 5:
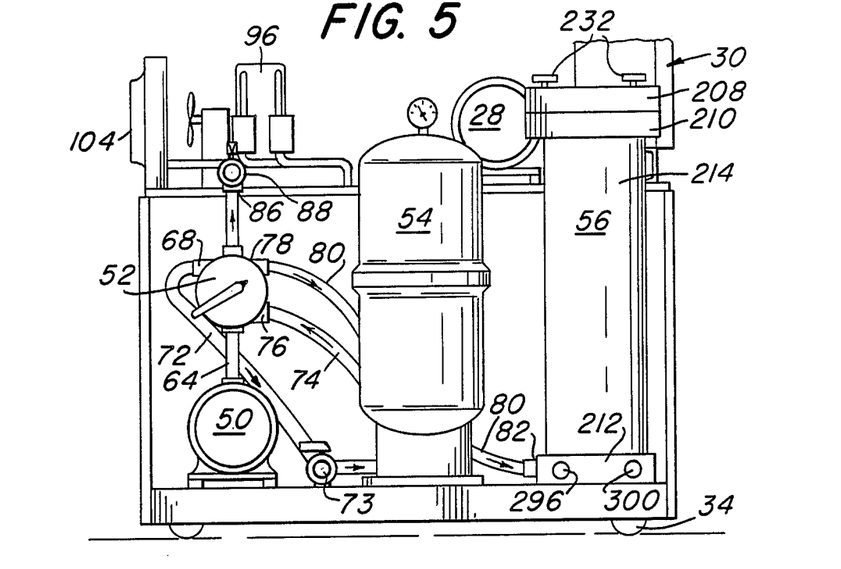
FIG. 5 is an end view of the system shown in FIG. 1.

When the six way diverter valve 52 is in the "by-pass" setting, dirty water from the tank 36 is pumped by pump 50 into inlet 60, through communicating conduit 64 into port 66 of the valve 52. The water flows through valve 52 to port 78 and not to port 68 (as is the case in the "filter" setting). Thus, when the valve is in the "by-pass" setting the dirty water completely bypasses the primary filter 54 but flows directly to the combined filter/ion adjusting unit 56 where the dirty water is filtered by the filter section contained therein. As noted earlier, the "by-pass" mode of operation is utilized when the primary (e.g., diatomaceous earth) filter becomes clogged or otherwise has to be serviced. Thus, when such is the case one can still operate the system 20 to filter the dirty water, albeit through a single filtration operation, thereby enabling the system to continue to be used. The primary filter 54 includes a drain valve 73 (FIGS. 1 and 5) connected in conduit 72 to enable the filter to be drained.

As will be appreciated by those skilled in the art, a diatomaceous earth filter needs to be "precoated" with the diatomaceous earth on its septum to form the "cake" before the filter can be put in operation. The system 20 is arranged to facilitate the precoating of the filter. This action occurs when the six way valve 52 is in the "recycle/blowdown" setting. To that end dirty water from the tank 36 is pumped by pump 50 through conduit 60 and conduit 64 into port 66 of the six way valve 52. From there the water flows through the valve to port 68 and hence conduit 70 to the inlet 72 of the diatomaceous earth filter 54. Accordingly, any diatomaceous earth particles in the water are trapped or coated on the septum (not shown) of the primary filter 54. Any particles which somehow pass through the filter 54 flow through conduit 74 and back to port 76 of the valve 52. From there the water with the particles therein flows through port 84 to the inlet 86 of the three way diverter valve 88. In this mode of operation, the valve 88 is set so that its inlet 86 is coupled to its outlet conduit 92. That conduit feeds back into the dirty tank so that the water with some diatomaceous earth particles in it flows back into the dirty tank for recycling back through the primary filter 54 until that filter is sufficiently precoated for use in the "filter" mode.

The use of a diatomaceous earth filter results in the collection of the particles (dirt) trapped on the surface of its cake (the filter element). This action results in a pressure drop across the filter as the dirt collects, with the pressure drop increasing with increasing dirt buildup, whereupon the filter becomes less effective. To overcome that factor it is frequently necessary to redistribute the cake, that is, mix the dirt distributed on the surface of the cake with the diatomaceous earth of the cake so that the filter becomes more effective. To accomplish that redistribution the six way valve is moved to the "redistribute" setting. In this setting dirty water from the tank 36 is pumped by pump 50 through inlet conduit 60, communicating conduit 64 to the six way valve port 66. From there the water flows through the valve to port 76, and communicating conduit 74 to the outlet of the diatomaceous earth filter 54. The water thus flows in a reverse direction through the filter 54, thereby blowing the dirt and the cake off of the filter's septum and through the inlet 72 of the filter 54. The mixture of water, precoat and dirt flow through conduit 70 into port 68 of the valve 52 and from there through port 84 to inlet 86 of the three way diverter valve 86. At this time the diverter valve is set to the same position as in the "precoate mode" so that its inlet 86 is coupled to its outlet conduit 92, whereupon the mixture of water, diatomaceous earth and dirt flows back into the dirty tank 36. In the dirty tank the mixture sloshes around while the reverse flow continues. The six way valve is thereafter moved to the "recycle/blowdown" setting. In this setting the dirty water from the tank 36 is pumped by pump 50 into conduit 60, through communicating conduit 64 into port 66 of the valve 52. That water flows through the valve to its port 68 and communicating conduit 70 to the inlet 72 of the primary filter 54. This forward flow of water through the filter causes the diatomaceous earth to coat its septum. This action continues until the redistribution of the cake is completed (i.e., the diatomaceous earth filter 54 is sufficiently precoated for subsequent use).

Eventually the cake of the diatomaceous earth filter septum contains too much dirt to be redistributed and recycled as described above. Thus, at this point, it is necessary to expel the used up precoat (cake) from the filter. This operation is known as "blowdown". To effect blowdown the operational mode selector valve 52 is set to the "recycle/blowdown" setting, but the three way valve 88 is set so that its inlet 86 is connected to its outlet conduit 90, and not to conduit 92. Hence, any liquid flowing through the valve 86 will not flow back to the dirty tank 36, but will instead flow to either a drain (not shown) or some reclamation system (not shown). That reclamation system can consist of any optional reclamation device, such as a sludge de-clarifier, etc.

The operational mode selector valve 52 can also be set to a "drain" setting. In this setting the dirty water is pumped by pump 50 from the dirty water tank through conduit 60, and conduit 64 to the inlet 66 of the valve 52. From there the water flows directly to port 84 of the valve and hence to inlet 86 of the three way valve 88. From there the dirty water flows through the communicating conduit 90 to the drain (not shown) or to the reclamation system (not shown). The drainage operation, as thus described, is accomplished quite infrequently, such as at the end of six months or one year time so that the user can service the dirty water tank.

In the "off" setting the valve is closed off so that the water cannot be pumped out of the dirty tank.

In the event it is desired to raise the temperature of the water an electrical immersion heater 94 is mounted in the dirty water tank 36. Power for the heater 94 is provided from the the control means 30, to be described later via electrical conductors (not shown). Power for the electrical motor 62 is also provided from the control means 30, via electrical conductors (not shown).

The temperature control module 26 basically comprises a conventional type refrigeration unit comprising a compressor 96, an expansion valve 98 and a suitable heat exchanger, such as tubular coil 100, through which a conventional refrigerant, e.g., Freon 12, flows. The module 26 also includes a cooling fan 102 for venting air through an exhaust port 104 in the unit 26. A temperature sensing probe, to be described later, is connected to the control means so that the operation of the refrigeration unit is controlled in response to the monitored temperature of the water in the clean tank. The unit 26 also includes full overload protection (not shown).

The unit 26 serves to lower the temperature of the water within the clean/storage tank 38 in the event it exceeds a set point temperature established by the user on a switch (to be described later) on a control panel of the control means 30. The coil 100 is mounted so that it is immersed within the water in the clean tank 38. Hence, the coolant fluid flowing through the coil serves to pick up heat from the water to lower its temperature. This heat transfer is accomplished very efficiently with no thermal loss to the ambient atmosphere, since the heat from the water passes directly through the wall (e.g. copper) of the coil 100 into the Freon.

The conditioned water supply pump module 28 basically comprises a conventional high pressure water pump, e.g., a regenerative vane turbine pump providing 0 to 250 PSIG, and having an inlet tube 106 extending into the clean tank 38. Other types of positive displacement pumps can be used although the turbine pump is preferred since it provides a smooth, non-vibrating, non-pulsating flow under high pressure. The pump 28 is driven by an associated electrical motor 108. Power for the motor 108 is provided from the control module 30 when the WEDM machine is operating. The outlet of pump 28 is provided into a common conduit 110 feeding a distribution network comprising a pair of supply or branch conduits 112. One of the conduits 112 serves to carry the clean water to the WEDM machine (or any other equipment or means requiring triple conditioned water). A pressure relief valve 114 is provided in conduit 110 and includes an overflow outlet pipe 116. The pipe 116 extends back into tank 38. The pressure relief valve 114 prevents damage to the system in the event that an inlet valve (not shown) to the WEDM machine is turned off while the pump 28 remains on. In such a case the water which is pumped by the pump 28 but which cannot flow into the WEDM machine flows out through overflow pipe 116 back into the clean tank.

It should be noted that each of the distributive branch conduits 112 can serve a separate system, e.g., plural WEDM machines with the conditioned water. Even if each system to be served operates at a different pressure the system 20 can accommodate such an arrangement by the mere use of respective pressure regulators in each of the conduits 112 of the distributive network.

In typical use, such as with a WEDM machine, it is almost certain that the conditioning of the water at some time will necessitate deionization to reduce its conductivity. Such action is carried by the ion adjustment section of the unit 56, as will be described in considerable detail later. That section basically comprises a deionizing resin bed to deionize the water to a predetermined conductivity. For a WEDM system the conductivity may be 50 microsiemens. In some instances it may, however, be desirable to increase the conductivity of the water. To that end the system 20 additionally comprises means 120 for effecting that end. Such means basically comprises a tank of brine or granular salt and having an outlet 122 coupled, via a solenoid 124, into a pair of dispenser conduits 126 and 128. The conduit 126 extends into the dirty tank 36 while the conduit 128 extends into the clean tank 38. Electrical signals for controlling the solenoid are provided from the control module 30.

The control module 30 includes among other things a control panel comprising all of the operator selector switches, pilot lights, operator alert lights, audible alarms and other associated components. The control module also includes the motor starting gear, control voltage transformer, plug-in-style relays, a conventional conductivity/resistivity controller and a solid state controller. All of these components are housed in a NEMA 12 fused interlock entrance switch housing. With such a control center the system operator can start or stop the conditioned water supply pump module, the pump/filtration module and/or the temperature control module, each independently of another. In practice, however, all three systems are generally operated in unison.

The control module also includes pressure, temperature and conductivity sensors, all to be described later. Those sensors work in conjunction with the solid state controller of control module to automatically control or alert the operator of the system to the condition of several pertinent phases, such as the need for servicing of either the primary or secondary filter, the temperature in the clean storage tank being beyond field adjustable temperature and time set points, the conductivity/resistivity of the water in the clean storage tank being teyond field adjustable conductivity and time set points, and water in the tanks being either too high or too low. A secondary field selectable switching network (not shown) is provided to immediately shut down the WEDM equipment (or other system for which water is provided) should any of the foregoing alerts be actuated.

The sensors for the control module 30 basically comprise a "high level" sensor 130 which is mounted within the dirty tank 36 at the upper end thereof. The sensor 130 provides an electrical signal via conductor 132 to the control module 30 when the water level in the tank reaches it. A second water level sensor is mounted in the dirty tank adjacent the bottom thereof. That sensor is denoted by the reference numeral 134 and serves as the low level or "makeup" sensor.

The high level sensor 130 serves to provide an alarm signal to the controller in the event that water in the dirty/receiving tank 36 reaches the height of the sensor. This signal is used to prevent the dirty tank from overflowing. To that end the signal is displayed by an indicator on the control panel and is also used to automatically cease operation of the WEDM machine to which the system 20 is connected. The low level or "makeup" sensor 134 serves to provide a signal, via line 136, when the water in the dirty/receiving tank 36 reaches its level, thereby indicating that the tank is almost dry. Thus, if the water level in the dirty/receiving tank is reduced by evaporation, spillage or other losses, before the pump 50 can run dry the sensor 134 provides a signal via line 136 to the controller module 30. A visual display of that condition is provided at the control panel and a signal is provided to stop the operation of primary pump motor 62. The operator of the system can then pour some water into the dirty/receiving tank and the system 20 restarted.

Disposed within the clean/storage tank 38 is another water level sensor 138. The sensor 138 is located in the tank 38 slightly below the level of the weir 42 and serves to provide a "service filter level" signal via conductor 140 to the control module 30. In this connection, when the water level in the clean tank has dropped to the level of the sensor 138 a signal is provided to warn personnel that the water level in the clean tank is dropping (such as could occur if the primary filter needed servicing). The sensor 138 is placed high enough in the tank so that there will be a sufficient body of clean water in the tank to enable the system 20 to operate to supply the water to the WEDM machine for a reasonable period of time, e.g., ten minutes to half an hour, thereby enabling the operating personnel to examine the filters to see if either is plugged up. If the primary filter is stopped up, then the operational mode selector valve 52 can be moved to the "by-pass" setting to enable the diatomaceous earth filter to be serviced, while the filter section in the unit 56 provides the systems filtration function. If the filter section (to be described later) of unit 56 is clogged up, the unit 56 can be readily opened to provide access to its interior so that the filter section can be removed or replaced. Such action can be accomplished in a few minutes. If the primary filter has to be serviced upon the occurrence of a "service filter level" signal all that is required for the operating personnel is to move the valve 52 to the by-pass position and to replenish the water in the clean tank. The servicing of the primary filter 54 can then be conducted at leisure without any stoppage of the system 20.

The control of the deionizing function of the system 20, that is, the passage of water through the ion adjusting section of unit 56 to reduce the conductivity of the water provided to the clean tank is a function of the measured conductivity (or resistivity) of the water in the clean tank. To that end, the control module 30 includes a combined conventional conductivity and temperature sensing probe 142 located in the clean tank and connected via conductors 144 to the conventional conductivity controller (not shown) in the control module 30. The probe 142 serves to provide a signal indicative of the measured conductivity (or resistivity) of the water in the tank to the conductivity/resistivity controller. That controller is a conventional device and cooperates with the solid state controller in the control module to provide signals to various components of the system 20 so that water from the dirty tank passes through the ion adjusting section, e.g., deionizer, of unit 56 before that water is provided into clean tank 38. In so doing, the conductivity of the water in the clean tank can be adjusted (lowered) to a desired set point. The signals provided by probe 142 also serve to control the operation of the brine/salt releasing solenoid valve 124 to increase the ionization of the water in both the clean and dirty tanks, if increased conductivity is desired.

The temperature sensing portion of probe 142 provides a signal, via conductor 144, to the control module 30, and from there to the chiller in the temperature control module 26 to cause that module to chill the water until it reaches a desired set point when the probe 144 senses that the temperature of the water in the clean tank is tending to exceed that set point. In the event that the temperature of the water is below a desired set point the control module causes the electric immersion heater 94 to heat the water in the dirty tank, hence ultimately raising the temperature of the water in the clean tank.

As stated earlier, the controller module includes a solid state controller (not shown). That controller is field adjustable to both temperature and conductivity set points via the use of surface sensitive type switches on the modules front panel. Thus, the system can be set to provide water within a prescribed temperature range (e.g., 30° to 100° F.) and whose conductivity is within a prescribed range (e.g., from 0 to 500 microsiemens). Those ranges, it should be noted, are not critical and thus the controller can be set up for other ranges if desired. Once the controller has been preset to the desired temperature and conductivity (or resistivity), the controller senses the input signals from the probe 142, compares it against the preset requirements and provides output signals to various on and off switches in the controller which serve to actuate or control various motors, relays, valves, etc., in the system 20.

As will be appreciated from the foregoing, by virtue of the location of the conductivity/resistivity probe within the clean tank the system 20 enables one to readily alter the water conditions in that tank prior to its being supplied to the WEDM machine, thereby providing considerable advantages over the patent to Ullmann et al. discussed earlier.

Figure 7:
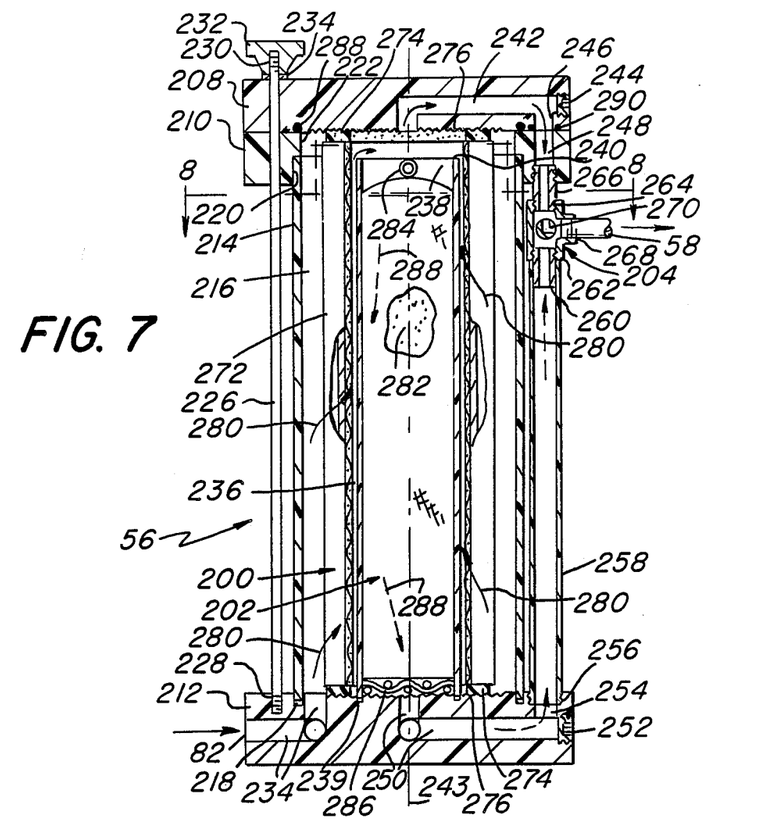
FIG. 7 is a vertical sectional view of a combined filter/deionizer unit constructed in accordance with another aspect of this invention and suitable for use in the system of FIG. 1 or for other water conditioning applications.
Figure 8:
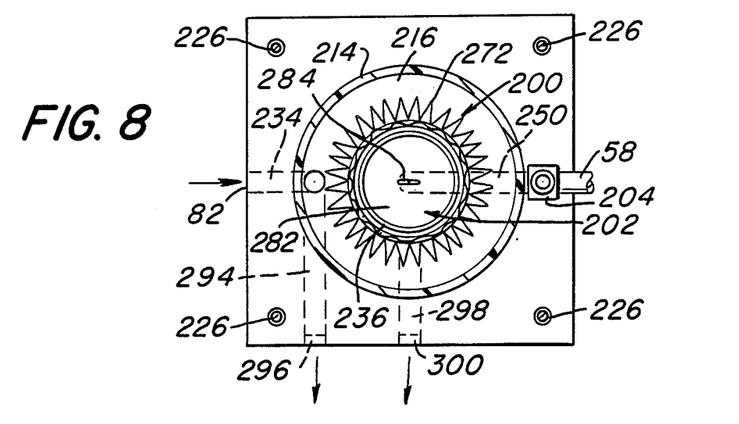
FIG. 8 is a sectional view taken along 8—8 of FIG. 7.
Figure 9:
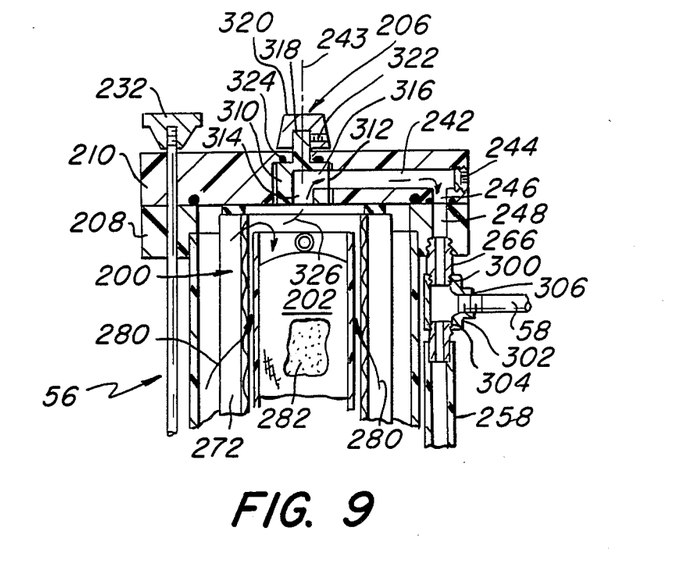
FIG. 9 is a vertical sectional view of the upper portion of an alternative combined filtration/deionizing device for that shown in FIG. 7.

Referring now to FIG. 7–9 the details of the combined filtration/ion adjusting unit 56 will now be described. That device is constructed of any suitable corrosion resistant materials, e.g., plastic, stainless steel, etc., and basically comprises an enclosed housing in which is located a filtration section 200 and an ion adjusting, e.g., deionizing, section 202. The unit 56 also includes selector means, to be described later, which is arranged to enable water which has been filtered by the filtration section 200 to selectively flow either through a path including the deionization section 202, so that the water exiting the unit 56 is both filtered and deionized, or through a path bypassing the deionization section, so that the water exiting the unit 56 is only filtered and not deionized. In one embodiment of the unit 56 shown in FIG. 7 the selector means basically comprises a diverter valve 204, to be described later, to enable the filtered water from the section 200 to either flow through or bypass the deionization section 202. In another embodiment of the unit 56 shown in FIG. 9 the selector means constitutes an adjustable valve 206 to enable a selected portion of the filtered water from section 200 to flow through the deionization section 202, while the remaining portion of the filtered water bypasses that section. The structure of the adjustable valve 206 will be described in considerable detail later. Suffice for now to state that it can enable a selected portion from a maximum percentage to a minimum percentage of the filtered water exiting section 200 to flow through the deionization section 202. Hence, with the embodiment of the unit 56 shown in FIG. 9 the amount of deionization provided by the unit can be adjusted from a minimum (when only a portion of the filtered water flows through the deionization section) to a maximum value (when all of the filtered water flows through the deionization section).

Referring now to FIG. 7 the details of the unit 56 which are common to both embodiments of FIGS. 7 and 9 and which are specific to only the embodiment of FIG. 7 will now be described.

As can be seen the housing of unit 56 basically comprises a cover plate 208, a top plate 210, a bottom plate 212 and a tubular sleeve or shell 214 interposed between the top and bottom plates to form an enclosed annular interior space or chamber 216. The bottom plate is a generally planar rectangular member having an annular recess 218 in its inner surface. The bottom edge of the tubular shell 214 is located within the annular recess 218, and, if desired, may be fixedly secured therein. The top plate 210 is also a generally planar rectangular member having an annular ledge 220 in its inner surface. The upper end of the shell 214 is disposed on the ledge 220, and if desired, may be fixedly secured thereto. A central opening 222 is provided in the top plate 210 contiguous with the inner surface of the shell 214. Disposed above the top plate is the cover plate 208 which is also of planar rectangular construction.

The cover plate is removeable and is held on the upper plate, with the shell 214 interposed between the upper and lower plates, via the use of four tie rods assemblies 226. Thus, as can be seen, a respective elongated tie rod extends through aligned openings in each corner of the cover plate 224 and the upper plate 210 so that its threaded bottom end 228 is threadedly engaged in a mating hole in the corresponding corner of the top surface of the bottom plate 212. The top end of each tie rod is also threaded at 230. An enlarged head, hand tightenable knob 232 is threadedly engaged on the upper end of each tie rod with a washer 234 interposed between it and the cover 224. Upon the tightening of the knob, tension is provided through the tie rod to pull the bottom plate toward the cover and top plate, thereby tightly closing off the interior chamber 216. The "dirty water" inlet 82 of the unit 56 communicates with a passageway 234 extending laterally into the bottom plate 112 to a position under the chamber 216 and immediately adjacent the inner surface of the sleeve 214. From there the passageway extends upward vertically and communicates with the interior of the annular chamber 216.

A second tubular shell or standpipe 236 is disposed within the shell 214. The shell 236 is of smaller outside diameter than the inner diameter of shell 214 to define the annular chamber 216 therebetween. The interior of the standpipe 236 defines a central chamber 238. The bottom edge of the standpipe 236 is received within an annular recess 239 in the top surface of the bottom plate 212. The upper end of the standpipe 236 is spaced below the inner surface of the cover plate 208 so that the annular chamber 216 is in fluid communication with the central chamber 238 over the top edge 240 of the standpipe. The cover plate 208 includes a passageway 242 in fluid communication with the top of central chamber 238. That passageway serves as a portion of a bypass path to carry water which has been filtered by section 200 to the diverter valve 204 at the outlet of the unit 56. To that end, the passageway 242 includes an axially extending portion aligned with the central axis 243 of the unit 56, a transversely extending portion terminating in an end having a threaded cap 244 releasably secured therein, and a downwardly extending portion 246. The passageway portion 246 is axially aligned with a passageway 248 in the top plate 210. The bottom plate 212 includes a passageway 250 in fluid communication with the bottom of central chamber 238. That passageway serves to carry water which has been filtered by section 200 and deionized by section 202 to the diverter valve 204 at the outlet of the unit 56. To that end passageway 250 includes an axially extending portion aligned with the central axis of the standpipe 236, a transverse portion terminating in a threaded cap 252 releasably secured therein and an upwardly extending portion 254 coaxially aligned with passageway portion 248. The portion 254 is in threaded engagement with the threaded lower end 256 of a riser tube 258. The riser tube is an elongated member which extends parallel to the longitudinal axis 243 of the unit 56 and terminates at its upper end in a tubular coupling 260 fixedly secured thereto. The upper end of the coupling is threadedly engaged to one inlet 262 of the diverter valve 204. The other inlet of the diverter valve 204 is denoted by the reference numeral 264 and is threadedly engaged to the lower end of a tubular coupling 266. The upper end of the coupling 266 is threadedly engaged in a threaded opening at the bottom of the passageway portion 248. The outlet port 268 of the diverter valve 204 serves as the outlet for the unit 56, and is connected to the threaded end of conduit 58. The diverter valve 204 also includes a movable internal member 270 having a passageway therein which is adapted to selectively couple either inlet port 264 to outlet port 268 or inlet port 262 to outlet port 268, but not to allow both inlets to communicate with the outlet at the same time.

In accordance with the preferred embodiment of the invention the filter section 202 basically comprises a conventional filter cartridge 272 of tubular construction and which is located in chamber 216 spaced slightly away from the outer surface of the standpipe 236. The cartridge is shown as being pleated and can be formed of any suitable material, e.g., paper. The cartridge 272 is held in place via a pair of resilient gaskets 274. Each gasket is a generally ring-shaped, resilient member. One gasket is interposed between the inner surface of the bottom plate and the bottom edge of the cartridge 200. The other gasket is interposed between the inner surface of the cover plate and the top edge of the cartridge. The central portion of the top surface of the bottom plate is serrated at 276 to provide a good gripping and sealing surface for the lower ring gasket 274. The inner or lower surface of the cover plate 208 is also serrated at 276 to provide a good gripping and sealing surface for the upper ring gasket 274.

With the cartridge disposed as just described dirty water entering the inlet 82 flows up through passageway 234 into chamber 216, thereby flowing through the pleats of the filter cartridge 272 in the direction of the arrows 280. The water passing through the cartridge is filtered by the cartridge and flows up the space between the inner surface of the cartridge and the outer surface of the standpipe 236 to its top edge 240. Depending upon the setting of the diverter valve 204 the filtered water either flows down through central chamber 238 or up into the bypass passage 242 in the cover plate, thereby bypassing the central chamber 238.

The chamber 238 serves as the location for the deionizing section 204 of the unit 56. To that end disposed within chamber 238 is an ion exchange resin bed 282. The resin bed is formed of any conventional suitable ion-exchange material of any grade and disposed within a porous bag. The resin bed is configured to fill substantially the entire chamber 238 and includes at its upper end a ring 284 to facilitate its removal and replacement, as will be described later. Disposed at the bottom of the chamber 238 is a wire mesh drain screen 286 which supports the resin bag thereon.

Operation of the device 56 in the combined filtration/deionization mode is as follows: the diverter valve 204 is rotated to the combined "filtration/deionization" position so that its inlet 262 is coupled to its outlet 268. Accordingly, water entering into the unit's inlet 82 flows up through communicating passageway 234 into the chamber 216. The water flows through the pleated cartridge 272 and up through the space between the interior surface of the cartridge and the outer surface of the standpipe 236 up to the top edge 240 of the standpipe, as described heretofore. Inasmuch as the diverter valve is in the combined "filtration/deionization" position, the filtered water is not able to flow upward into passageway 242. Instead the water flows downward in the direction of the dotted arrows 286 through central chamber. Hence, the filtered water passes through the walls of the bag and into the resin bed contained therein whereupon the water is deionized. The water continues to flow downward through the resin bed, and out its bottom through wire mesh screen 286, and into communicating passageway 250. From there the filtered/deionized water flows up through the riser tube 258 into the diverter valve's inlet port 262 and out through its outlet 268 into conduit 58.

Operation of the device to provide only filtered, and not deionized, water is as follows: the diverter valve 204 is rotated to the "filter only" position so that its inlet port 264 is in communication with the outlet port 268. Accordingly, the water that passes through the pleated filter cartridge 272 will not flow down through the deionizing section 204 but instead flows up through passageway 242, communicating passageways 246 and 248 into the diverter valve's inlet port 264 and from there to its outlet port 268 and conduit 58.

It should be pointed out at this juncture that the diverter valve 204 can be either an automatic or manual valve. In the system 20, as described heretofore, the valve preferably is automatic in operation and under control from the control module 30. The automatic control means for valve 204 are not shown herein in the interests of drawing simplicity.

The device 56 is constructed so that it can be readily disassembled to provide access to the interior thereof so that either the filter cartridge 272 or the resin bag 282 can be separately removed and replaced. Thus, all that is necessary to provide access to the interior of the device is to release the lock knobs 232 so that the cover plate 208 can be removed. This action provides access to the interior of the unit.

In order to ensure that the interface between the top plate 210 and the cover plate 208 is watertight, two O-ring seals 288 and 290 are interposed therebetween. Thus, one O-ring 288 is interposed between the plates 208 and 210 surrounding the top of chamber 216. The other O-ring 290 is interposed between those plates surrounding the interface of communicating passageways 246 and 248.

In order to drain the chamber in which the cartridge filter 272 is located a transversely extending drain hole 294 (FIG. 8) is provided located in the bottom plate 212 and communicating with the passageway 234. The end of the drain hole is normally connected to a suitable drain valve or plugged by a threaded cap 296. In a similar manner the bottom plate 212 includes a resin drain hole 298 which communicates with the passageway 250. The end of hole 298 is connected to a suitable drain valve or sealed by a threaded cap 300.

As should be appreciated from the foregoing, with the construction of the unit as described earlier water first passes through the filter cartridge 272 thus providing positive barrier filtration and protecting the resin bed 272. Moreover, by virtue of the fact that the water flows downward through the ion exchange section it has greater exposure and residence time to the beads thereof to effect a good deionization action.

The riser tube is preferably formed of a transparent material to enable one to see the condition of the filtered and deionized water flowing therethrough. Hence, any discoloration of the ordinarily clear water (indicating a malfunction of the system) can be readily determined to exist and appropriate steps taken to remedy whatever problem exists.

Referring now to FIG. 9 there is shown the alternative embodiment of the combined filter/deionization unit 56.

That unit includes the heretofore identified adjustable selector means 206 in the form of an adjustable valve to enable a selected portion of the water filtered by filter cartridge 272 to pass through the deionization bed 282 while enabling the remainder to flow through a path bypassing the resin bed. The bypass path includes a passageway through the valve 206, to be described hereinafter, as well as the heretofore earlier described comunicating passageways 242, 246, 248 and tubular coupling 266. The tubular coupling 266 is threadedly connected at its lower end to a threaded inlet 300 in a T coupling 302. The coupling 302 includes a second threaded inlet 304 to which the upper threaded end of coupling 260 is connected. The threaded end of conduit 58 is connected to a threaded outlet 306 of the T-coupling. Both inlets 300 and 304 are in fluid communication with outlet 306. Hence, water passing through the bypass path 242 (and its communicating passageways), and the deionization path (i.e., through the resin bed in the central chamber, out through its communication passageway 250 and up through the riser tube 58) mix together in the T coupling 302 and exit through its outlet 306 into conduit 58.

The adjustable valve 206 basically comprises a rotatable plug 310 disposed within a cylindrical bore 312 in the cap plate 208 and aligned with the central axis 243. The plug includes an internal passageway, a portion of which 314 is centered on the central axis 243 and a radially extending portion 316. The plug 310 is arranged to be rotated about axis 243 so that its passageway portion 316 can be brought into fluid communication with passageway portion 242 in the cap plate 208. To that end the plug includes a shaft 318 projecting out of the top plate and or which is mounted a rotatable knob 320. The knob is held in place via a set screw 322. An O-ring 324 is interposed between the plug 310 and the hole in the top plate in which the plug is mounted. This O-ring serves to prevent water from leaking out of the valve.

As will be appreciated by those skilled in the art, when the knob 320 is rotated so that no portion of the passageway 316 is in communication with the passageway 242 in the cap plate no water can flow through the bypass path. Hence, all of the water filtered by cartridge 272 will flow through the deionization bed 282, through the communicating passageways in the bottom plate and up through the riser tube 258 to the T joint 302 and out through conduit 58. Thus, in such an arrangement the unit 56 will provide water which has been filtered and deionized.

When the selector means 206 is rotated so that its passageway 310 is fully axially aligned with passageway portion 242 then not only will a portion of the water flow down through the resin bed as just described but a portion will flow up through the bypass path in the direction of the broken arrows 326 through the adjustable valve 206. The angular position of the valve 206 can be adjusted through a continuous range so that any portion of passageway 316 can be brought in communication with passageway 242 in the cap plate. Accordingly, the amount of filtered water allowed to bypass the deionization unit can be adjusted through a continuous range from a maximum to a minimum.

As will be appreciated by those skilled in the art, by placing the valve 206 in the removable cap plate 210, the cap with the valve can be removed from the unit to provide access to the interior of the unit and without necessitating any disconnection of any other pipe work for the unit, inasmuch as all other pipe work is internal to the unit.

As will be appreciated from the foregoing, the system 20 of the subject invention is extremely effective to triple condition water for WEDM or other processes. Moreover, by virtue of the fact that the temperature and conductivity of the water to be provided to the WEDM machine or other process is monitored in the clean tank and before it is pumped or provided to the WEDM machine or other unit adjustment can be made if the temperature or conductivity varies. Moreover, the subject system can be operated in a bypass mode wherein it is not on line with the WEDM machine so that it monitors temperature and conductivity and adjusts the water accordingly even if the WEDM machine is not running. Thus, with the subject system one does not have to take clean water from the clean tank nor supply dirty water to the dirty tank for the system to run. Hence, the water provided by the system is always immediately ready for use when the WEDM machine or other process is reinitiated. Further still the system is also arranged to operate when it is on line with the WEDM machine or other process so as to monitor and control the conductivity and temperature of the water being fed to the WEDM machine or other process.

The system is extremely flexible in that it may make use of inexpensive primary filter medium to effect the entrapment of particulate material above a predetermined size, while utilizing a combined filter/ion adjusting unit for providing secondary filtration and selective deionization when the primary filter is operative and primary filtration and selective deionization when the primary filter is inoperative, e.g., being serviced.

The combined filtration/deionization unit is a simple device which takes up very little space, can be readily serviced and enables the selective and independent replacement of either the filter medium or either the deionization means contained therein. That unit thus has particular utility in the subject system, but also can be utilized in any system needing filtered water and selectively deionized water.

It should be pointed out at this juncture that, if desired, the subject system can be modified to utilize two clean water tanks, one a "roughing" tank and another a "finishing" tank. The roughing tank can have water of one conductivity and the finishing tank water of another conductivity. Such a duplex system would necessarily require additional piping and valves to ensure that the water treated by the system is provided to the respective tanks and from there to the WEDM machine or other process making use of that treated water.

Without further elaboration the foregoing will so fully illustrate my invention that others may, by applying current or future knowledge, adopt the same for use under various conditions of service.

I claim:

1. A self-contained, modular system for conditioning water for use in a predetermined process, said system comprising a first tank adapted to receive water to be conditioned, a filtration and ion adjusting section, a temperature adjusting section, second tank means for receiving conditioned water and sensor and control means, said filtration and ion adjusting section comprising first pump means coupled to said first tank for providing water from said first tank to first filtration means, said first filtration means being operative to remove solids greater than a predetermined size from said water, selectable means for enabling at least a portion of the water from said first filtration means to be pumped by said first pump means directly to said second tank or to means for adjusting the ion content of the water provided thereto, said water from said ion adjusting means being provided by said first pump means to said second tank, said temperature adjusting section comprising temperature adjusting means for adjusting the temperature of the water in said second tank, said sensor and control means comprising sensor means associated with said second tank for providing electrical signals indicative of the electrical conductivity and temperature of the water in said second tank, and means for enabling water from said second tank to be provided back to said first filtration and ion adjusting section for subsequent conditioning in the event that the electrical conductivity of the water in said second tank is not as desired.

2. The system of claim 1 additionally comprising second filtration means in said filtration and ion adjusting section coupled to said first pump means upstream of said first filtration means and operative to remove solids greater than a predetermined size from water provided thereto by said first pump means.

3. The system of claim 2 wherein said filtration and ion adjusting section includes valve means for selectively inserting or removing said second filtration means from the path of water flow through said section.

4. The system of claim 2 wherein said temperature adjusting means comprises at least one cooled element immersed in the water in said second tank.

5. The system of claim 1 wherein said temperature adjusting means comprises at least one cooled element immersed in the water in said second tank.

6. The system of claim 5 wherein said cooled element comprises a coil having a cooling fluid flowing therethrough.

7. The system of claim 1 wherein said filtration and ion adjusting section includes pressure flow regulator means disposed downstream of said first filtration means and said ion adjusting means and upstream of said second tank.

8. The system of claim 7 wherein said filtration and ion adjusting section includes valve means for selectively inserting or removing said second filtration means from the path of water flow through said section.

9. The system of claim 8 additionally comprising second pump means for pumping water from said second tank for use in said process.

10. The system of claim 9 additionally comprising pressure relief valve means for enabling water to overflow therefrom in the event that the pressure of water from said second pump means exceeds a predetermined value, whereupon said overflow water flows back into said second tank.

11. The system of claim 10 wherein said temperature adjusting means comprises at least one cooled element immersed in the water in said second tank.

12. The system of claim 11 wherein said temperature adjustment means additionally comprises means located within said second tank to increase the temperature of said water therein.

13. The system of claim 12 wherein said means located within said second tank to increase the temperature of said water therein comprises an electrical immersion heater.

14. The system of claim 1 wherein said ion adjusting means comprises means to deionize water passing therethrough.

15. The system of claim 14 additionally comprising means for ionizing the water located within said second tank.

16. The system of claim 1 additionally comprising display means to display parameters of said system.

17. The system of claim 1 wherein said first and second tanks are disposed immediately adjacent each other and separated by a weir, said weir enabling water in said second tank to overflow back into said first tank.

18. The system of claim 17 additionally comprising sensor means to provide signals indicating if the water in said first tank is below a predetermined minimum height or above a predetermined maximum height.

19. The system of claim 18 additionally comprising sensor means to provide a signal indicating if the water in said second tank reaches a predetermined minimum value.

20. The system of claim 1 additionally comprising sensor means to provide signals indicating if the water in said first tank is below a predetermined minimum height or above a predetermined maximum height.

21. The system of claim 20 wherein said control means is operative in response to said sensor means to stop the operation of said first pump in the event that the amount of water in said first tank reaches said predetermined maximum height.

22. The system of claim 21 wherein said control means provides an alarm signal in response to said sensor means when the amount of water in said first tank reaches said predetermined minimum height.

23. The system of claim 22 additionally comprising sensor means to provide a signal indicating if the water in said second tank reaches a predetermined minimum value.

24. The system of claim 1 wherein said control means automatically controls the operation of said temperature adjusting means in response to the signal indicating the temperature of the water in said second tank as sensed by said sensor means.

25. The system of claim 1 wherein said water is provided from said second tank back to said first filtration and ion adjusting section by said control means in automatic response to the signal from the sensor means indicating the conductivity of the water in said second tank.

26. The system of claim 25 wherein said control means automatically controls the operation of said temperature adjusting means in response to the signal indicating the temperature of the water in said second tank as sensed by said sensor means.

27. The system of claim 1 wherein said first filtration means and said ion adjusting means are disposed within a common housing, said common housing also comprising said selectable means to enable water to flow through said first filtration means and with at least a portion thereof flowing through either said ion adjusting means or through a path bypassing said ion adjusting means.

28. The system of claim 27 wherein said first filtration means comprises a cylindrically shaped filter medium defining a central space therein and wherein said ion adjusting means comprises an ion exchange medium disposed within said central space.

29. The system of claim 28 wherein said housing includes a common outlet having a pair of conduits leading thereto, one of said conduits being in fluid communication with said filter medium downstream thereof and the other of said conduits being in fluid communication with said ion exchange medium, downstream thereof, whereupon all of said water flows through said filter medium and with a predetermined portion thereof flowing through said ion exchange medium depending upon said selectable means, said predetermined portion of water being at least either all of said water flowing through said filter medium, or none of it.

30. The system of claim 29 wherein said predetermined portion of said water is any portion of the water flowing through the filter medium.

31. The system of claim 29 wherein said selectable means comprises a three-way valve coupled to said two conduits.

32. The system of claim, 31 wherein said three-way valve operates in response to signals from said control means.

33. The system of claim 29 wherein said selectable means comprises an adjustable valve for adjusting the amount of water flowing through said one of said conduits to said outlet.

34. The system of claim 27 wherein said first filter medium is removable from said housing for enabling the replacement thereof.

35. The system of claim 27 wherein said first filter medium is removable from said housing for enabling the replacement thereof.

36. The system of claim 35 wherein said first filter medium is removable from said housing for enabling the replacement thereof.

37. The system of claim 36 wherein said first filter medium comprises a cartridge filter and wherein said ion adjusting means comprises an ion exchange resin bed.

38. A water treatment device for filtering water to remove suspended solids having a size greater than a predetermined value therefrom and for selectably adjusting the ion content of the water filtered thereby, said device comprising a common housing, filter medium means disposed within said housing and defining an interior space, deionizing means disposed within said interior space, and selectable means for enabling at least a portion of water flowing through said filter medium means to be directed through said deionizing means, or directly to an outlet of said device without passing through said deionizing means, depending upon the setting thereof, said outlet also being coupled to said deionizing means downstream thereof so that and water flowing through said deionizing means also flows to said outlet.

39. The water treatment device of claim 38 wherein said filter medium means is removable from said housing for replacement thereof.

40. The water treatment device of claim 38 wherein said deionizing means is removable from said housing for replacement thereof.

41. The water treatment device of claim 38 wherein said selectable means comprises an adjustable valve.

42. The water treatment device of claim 41 wherein said housing includes a removable head and wherein said valve means forms a portion of said head.

43. The water treatment device of claim 42 wherein said removable head can be removed from said housing without necessitating any disconnection of piping or fittings.

44. The water treatment device of claim 38 wherein said housing comprises an inlet, an outlet, an enclosed outer body and a tubular shell disposed within said body and defining an interior space, said filter medium comprising a cartridge disposed within said body and around said inner shell to enable water to flow from said inlet through said cartridge and along said inner shell, said deionizing means comprising an ion exchange body located within said inner shell, said selectable means enabling water from said cartridge to flow up said inner shell and either directly out said outlet or else enabling at least a portion thereof to flow down through said ion exchange body and then out said outlet.

45. The water treatment device of claim 44 wherein said housing includes a first conduit in communication with said cartridge filter downstream thereof and in communication with said ion exchange body upstream thereof, and a second conduit in communication with said ion exchange body downstream thereof, said first and second conduits being coupled to said outlet.

46. The water treatment device of claim 45 wherein said device additionally comprises valve means selectively coupling said first and second conduits to said outlet.

47. The device of claim 46 wherein said valve means comprises a three-way valve.

48. The device of claim 45 or 46 wherein said device additionally comprises valve means for establishing the proportion of water flowing through said first and second conduits.

49. The device of claim 44 wherein said outer body includes a plurality of components which can be readily assembled and disassembled.

50. The water treatment device of claim 38 wherein said selectable means is moveable to a setting for permitting all of said water exiting the outlet to be directed through said deionizing means.

51. The water treatment device of claim 38 wherein said selectable means is moveable to a setting for permitting all of said water existing the outlet to by pass the deionizing means.

52. The water treatment device of claim 38 wherein said selectable means is moveable to a setting for permitting only some of said water exiting the outlet to bypass the deionizing means.

* * * * *